United States Patent
Martinez et al.

(10) Patent No.: US 8,820,679 B2
(45) Date of Patent: Sep. 2, 2014

(54) UNLOCKING OF A STABILIZING MEMBER OF A FOLDING STRUT OF AIRCRAFT LANDING GEAR

(75) Inventors: Laurent Martinez, Mercer Island, WA (US); François Boilley, Arcueil (FR); Gérard Balducci, Saint Germain la Grange (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 923 days.

(21) Appl. No.: 12/990,648

(22) PCT Filed: Mar. 12, 2009

(86) PCT No.: PCT/FR2009/000255
§ 371 (c)(1),
(2), (4) Date: Mar. 10, 2011

(87) PCT Pub. No.: WO2009/115713
PCT Pub. Date: Sep. 24, 2009

(65) Prior Publication Data
US 2011/0163202 A1    Jul. 7, 2011

(30) Foreign Application Priority Data
Mar. 14, 2008 (FR) ..................... 08 01408

(51) Int. Cl.
*B64C 25/26* (2006.01)
(52) U.S. Cl.
USPC .................................. 244/102 SL

(58) Field of Classification Search
USPC ......... 244/102 R, 102 SL, 1 N, 100 R, 102 A
See application file for complete search history.

(56) References Cited

U.S. PATENT DOCUMENTS

| 2,444,319 | A | * | 6/1948 | Winter .................... 244/102 SL |
| 4,328,939 | A | * | 5/1982 | Davies et al. ............. 244/102 R |
| 5,022,609 | A |   | 6/1991 | Cranston |
| 7,967,245 | B2 | * | 6/2011 | Seror-Goguet et al. . 244/102 SL |
| 8,186,620 | B2 | * | 5/2012 | Luce et al. ............. 244/102 SS |

FOREIGN PATENT DOCUMENTS

| FR | 1547764 A | 11/1968 |
| GB | 518073 A | 2/1940 |

* cited by examiner

*Primary Examiner* — Valentina Xavier
(74) *Attorney, Agent, or Firm* — Sughrue Mion, PLLC

(57) ABSTRACT

The invention relates to landing gear mounted on an aircraft in such a way as to be movable between a stowed position and a deployed position, the landing gear incorporating: a barrel mounted in a hinged way on the aircraft; a folding strut with two arms; a stabilizing member to stabilize the strut in an aligned position, having two rods hinged to each other; a telescopic unlocking member having one end coupled to one of the rods, the telescopic member being selectively activatable to break an alignment of the rods. According to the invention, said rod has an aperture in which the end of the telescopic unlocking member engages and which is arranged in such a way that, when the telescopic member is activated, said end interacts with an end of the aperture to move the associated rod toward a non-aligned position which said rod reaches when the telescopic member reaches an internal stop, the aperture allowing any hinged movement of the rod beyond the non-aligned position.

3 Claims, 1 Drawing Sheet

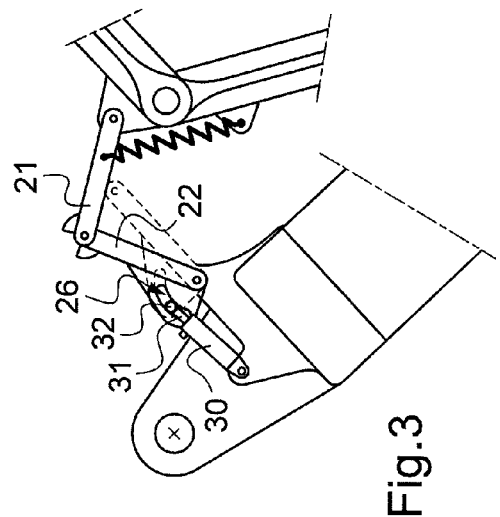
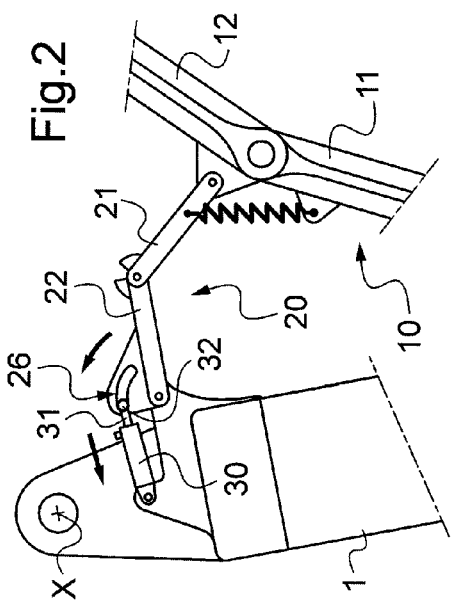
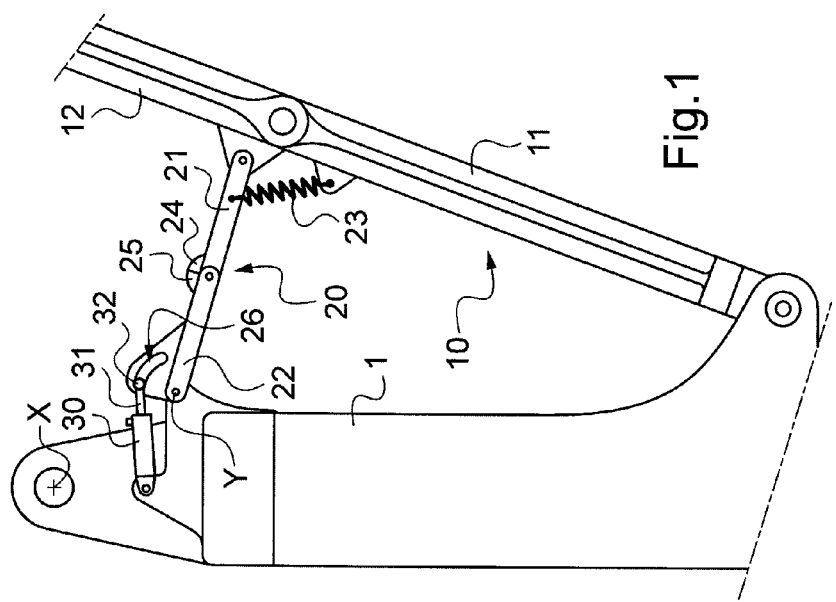

UNLOCKING OF A STABILIZING MEMBER OF A FOLDING STRUT OF AIRCRAFT LANDING GEAR

The invention relates to the field of landing gear, and more specifically to the unlocking of a stabilizing member of a folding strut of aircraft landing gear.

BACKGROUND OF THE INVENTION

Many types of retractable landing gear are kept in the deployed position by means of a folding strut having two arms which are hinged to each other and which are kept in a substantially aligned position by a stabilizing member. One of the arms is hinged to a barrel of the landing gear, while the other arm is hinged to the aircraft structure. When kept aligned in this way, the strut arms form a bracing structure, which immobilizes the landing gear in the deployed position.

As a general rule, the stabilizing member itself incorporates two rods hinged to each other, the two rods being pushed back by a spring member toward an aligned position in which they stabilize the arms of the strut in the aligned position. An unlocking actuator is used to break the alignment of the rods of the stabilizing member, thus breaking the alignment of the strut arms and allowing the landing gear to be raised by the action of a raising actuator, which, for example, acts directly on the barrel of the landing gear.

In a known form, the unlocking actuator is a telescopic actuator coupled at one end to the landing gear barrel or to one of the strut arms, and at the other end to one of the rods of the stabilizing member. When the landing gear is deployed from a stowed position to its deployed position, the telescopic unlocking actuator is normally free to extend or contract in accordance with the relative movements of the two parts to which it is coupled.

During the folding of the landing gear into the stowed position, the telescopic unlocking actuator should be activated in such a way that it breaks the alignment of the stabilizing rods. The raising actuator then takes over to move the landing gear toward its stowed position. The strut arms and the rods of the stabilizing member have relative rotary movements imparted to them during the raising of the landing gear, and they also impart telescopic movements to the telescopic unlocking actuator, as a result of which the telescopic actuator, if still active, may oppose the raising movement.

One immediate solution to this problem is to deactivate the telescopic unlocking actuator as soon as it has performed its function, in other words as soon as it has broken the alignment of the rods of the strut stabilizing member. However, this procedure requires a more complex raising logic with the provision of sensors positioned to detect when the alignment of the rods has been broken, making it necessary to provide wiring on moving parts of the landing gear to carry information from the sensors to the computer which implements the raising logic.

OBJECT OF THE INVENTION

The object of the invention is to provide a solution which does not require the inactivation of the telescopic unlocking member during the raising of the landing gear, but which prevents the telescopic member, when it remains active, from opposing the raising of the landing gear.

BRIEF DESCRIPTION OF THE INVENTION

For this purpose, the invention proposes landing gear designed to be mounted on an aircraft in such a way as to be movable between a stowed position and a deployed position, the landing gear incorporating:
- a barrel mounted in a hinged way on the aircraft to enable the landing gear to move between the stowed position and the deployed position;
- a folding strut with two arms hinged to each other, one of which is hinged to the aircraft while the other is hinged to the landing gear, the two arms being in a substantially aligned position at least when the landing gear is in the deployed position;
- a stabilizing member to stabilize the strut in an aligned position, having two rods hinged to each other, one of which is hinged to one of the arms of the strut while the other is hinged to the landing gear or to the aircraft, the two rods being pushed back by a spring member toward an aligned position in which they stabilize the arms of the strut in a substantially aligned position;
- a telescopic unlocking member having one end coupled to one of the rods, the telescopic member being selectively activatable to break an alignment of the rods;

wherein said rod has an aperture in which the end of the telescopic unlocking member engages and which is arranged in such a way that, when the telescopic member is activated, said end interacts with an end of the aperture to move said rod toward a non-aligned position which said rod reaches when the telescopic member reaches an internal stop, the aperture allowing any hinged movement of said rod beyond the non-aligned position.

Thus, when the landing gear is raised, the telescopic unlocking member is activated to break the alignment of the rods. The alignment of the arms of the strut is thus also broken, enabling the landing gear to be raised by the raising actuator. During the movement imparted by the raising actuator, it is possible that the rod coupled to the unlocking member may pivot beyond the non-aligned position. Because of the arrangement according to the invention, this movement beyond the non-aligned position takes place without any stress on the unlocking member, and therefore this member cannot oppose the movement of the rod.

Thus this arrangement prevents any opposition or resistance by the unlocking member to the pivoting of the rod beyond the non-aligned position, while allowing a simple command logic to be retained for the unlocking member, which can remain active throughout the raising operation.

Furthermore, this arrangement makes it unnecessary to provide the unlocking member with the overtravel, which is required in known landing gear to prevent the unlocking member from impeding any movement of the rod beyond the non-aligned position. Consequently the unlocking actuator can be designed with a short operating travel, making this actuator particularly compact.

BRIEF DESCRIPTION OF THE DRAWINGS

The invention will be more clearly understood from the figures of the appended drawing, of which:

FIG. 1 is a schematic side view of an item of landing gear in the deployed position, showing the unlocking member and the rod provided with the circular aperture according to the invention, the landing gear being depicted in the deployed position;

FIG. 2 is an enlarged view of the landing gear of FIG. 1, showing the landing gear in the course of raising at the point where the unlocking member has just broken the alignment of the rods;

FIG. 3 is a view similar to that of FIG. 2, showing the landing gear in a subsequent stage of raising.

DETAILED DESCRIPTION OF THE INVENTION

With reference to FIG. 1, the illustrated landing gear has a barrel 1 hinged to the structure of the aircraft about the axis X, which is seen end-on in this view. The barrel 1 houses a sliding shaft (not shown here), which carries one or more wheels on its end. In a known way, the landing gear is kept in the deployed position by means of a strut 10 having a lower arm 11 and an upper arm 12 hinged to each other, the lower arm 11 being hinged to the barrel 1 while the upper arm 12 is hinged to the structure of the aircraft. The arms 11 and 12 of the strut are kept in the substantially aligned position shown here by means of a stabilizing member 20.

The stabilizing member 20 has a first rod 21 and a second rod 22 hinged to each other, the first rod 21 being hinged in this case to the upper arm 12 of the strut, while the second rod 22 is hinged to the barrel 1. A spring member 23 coupled to the first rod 21 returns the rods 21 and 22 to the aligned position shown here, which is delimited by stops 24 and 25 positioned on each of the rods so as to contact each other under the action of the spring member 23.

The rods 21 and 22 are thus supported in their aligned position and thereby contribute to the stabilization of the arms 11 and 12 of the strut 10 in the substantially aligned position. Thus, the strut 10 forms a rigid assembly capable of immobilizing the landing gear barrel 1 with respect to rotation about the axis X when it is in the deployed position shown here. All of these features are generally known and are described here in order to provide the background of the invention.

To enable the landing gear to be raised, the alignment of the arms 11 and 12 of the strut 10 should be broken. For this purpose, a telescopic unlocking actuator 30, in this case a single-acting hydraulic actuator, is coupled between the barrel 1 and the second rod 22, in such a way that, when it is activated, it exerts a force that tends to break the alignment of the rods in opposition to the spring member 23.

According to the invention, the end 32 of the rod 31 of the unlocking actuator 30, which is coupled to the second rod 22 is engaged in a circular aperture 26, which is formed in the second rod 22 and which in this case extends in the form of an arc of a circle centered on the axis Y (parallel to the axis X in this case) of the hinging of the second rod 22 on the barrel 1.

As shown in FIG. 2, when the unlocking actuator 30 is activated in a direction which tends to make the rod 31 retract, the end 32 of the rod 31 interacts with an end of the circular aperture 26 so as to pull on the second rod 22 and make it rotate about its axis of hinging to the barrel 1, resulting in the breaking of the alignment of the rods 21 and 22. When the unlocking actuator 30 reaches its fully retracted position, the second rod 22 is brought into the non-aligned position shown in FIG. 2, in which the alignment of the arms 11 and 12 of the strut 10 is broken sufficiently to allow the landing gear to be raised by the action of a raising actuator (not shown) which acts directly on the barrel 1 to pivot it about its hinging axis X.

During the raising of the landing gear, it is possible that the second rod 22 may be brought toward an angular position located beyond the non-aligned position, as shown in FIG. 3. It can be seen in this figure that the aperture 26 allows the second rod 22 to move beyond the non-aligned position (shown in dotted lines) because the end of the rod of the unlocking actuator can travel freely in the circular aperture, without opposing or resisting the movement of the second rod 22 beyond the non-aligned position.

Thus the raising mechanism is particularly simple. It suffices to activate the unlocking actuator and the raising actuator at the same time. The unlocking actuator 30 pulls on the second rod 22 to bring it to the non-aligned position, after which the raising actuator, whose action is made possible by the breaking of the alignment of the arms of the strut 10, continues the movement by raising the landing gear. During the raising, the unlocking actuator 30 remains active and is thus kept in the retracted position. However, owing to the aperture 26, the unlocking actuator does not create any resistance to the movement of the second rod beyond the non-aligned position.

The invention is not limited to the arrangement described above, but incorporates all variants falling within the scope of the claims. In particular, although it has been stated herein that the aperture is circular, in such a way that the actuator remains immobile with respect to the barrel when the end of the rod travels freely in the aperture, it is possible to use apertures of different shapes, provided that they allow the associated rod to move beyond the non-aligned position when the actuator is fully retracted.

Furthermore, in the arrangement described herein the unlocking actuator 30 and the associated rod 22 are both hinged to the barrel 1 of the landing gear. Other arrangements are generally known. For example, the unlocking actuator can be coupled to one of the strut arms and act on whichever of the two rods is coupled to the strut. In another known configuration, the unlocking actuator can be coupled to the structure of the aircraft and can act on whichever of the two rods is hinged to the structure of the aircraft. The application of the invention to these configurations will be evident to those skilled in the art.

Finally, although the unlocking actuator described herein is one which, when activated, retracts to a position defined by an internal retraction stop, it will be evident to those skilled in the art that the arrangement according to the invention can be applied to an unlocking actuator which, when activated, extends to a position defined by an internal extension stop.

What is claimed is:

1. Landing gear mounted on an aircraft in such a way as to be movable between a stowed position and a deployed position, the landing gear comprising:
   a barrel mounted in a hinged way on the aircraft to enable the landing gear to move between the stowed position and the deployed position;
   a folding strut with two arms hinged to each other, one of which is hinged to the aircraft while the other is hinged to the landing gear, the two arms being in a substantially aligned position at least when the landing gear is in the deployed position;
   a stabilizing member to stabilize the strut in an aligned position, having two rods hinged to each other, one of which is hinged to the strut while the other is hinged to the landing gear or to the aircraft, the two rods being pushed back by springs toward an aligned position in which they stabilize the arms of the strut in a substantially aligned position;
   a telescopic unlocking member having one end coupled to one of the rods, the telescopic unlocking member being selectively activatable to break an alignment of the rods;
   wherein said rod has an aperture in which the end of the telescopic unlocking member engages and which is arranged in such a way that, when the telescopic unlocking member is activated, said end interacts with an end of the aperture to move said rod toward a non-aligned position which said rod reaches when the telescopic member reaches an internal stop, the aperture allowing any hinged movement of said rod beyond the non-aligned position.

2. The landing gear as claimed in claim 1, in which the aperture extends along an arc of a circle centered on a hinging axis of said rod.

3. The landing gear as claimed in claim 2 in which the aperture has two circular ends.

* * * * *